United States Patent Office 3,119,672
Patented Jan. 28, 1964

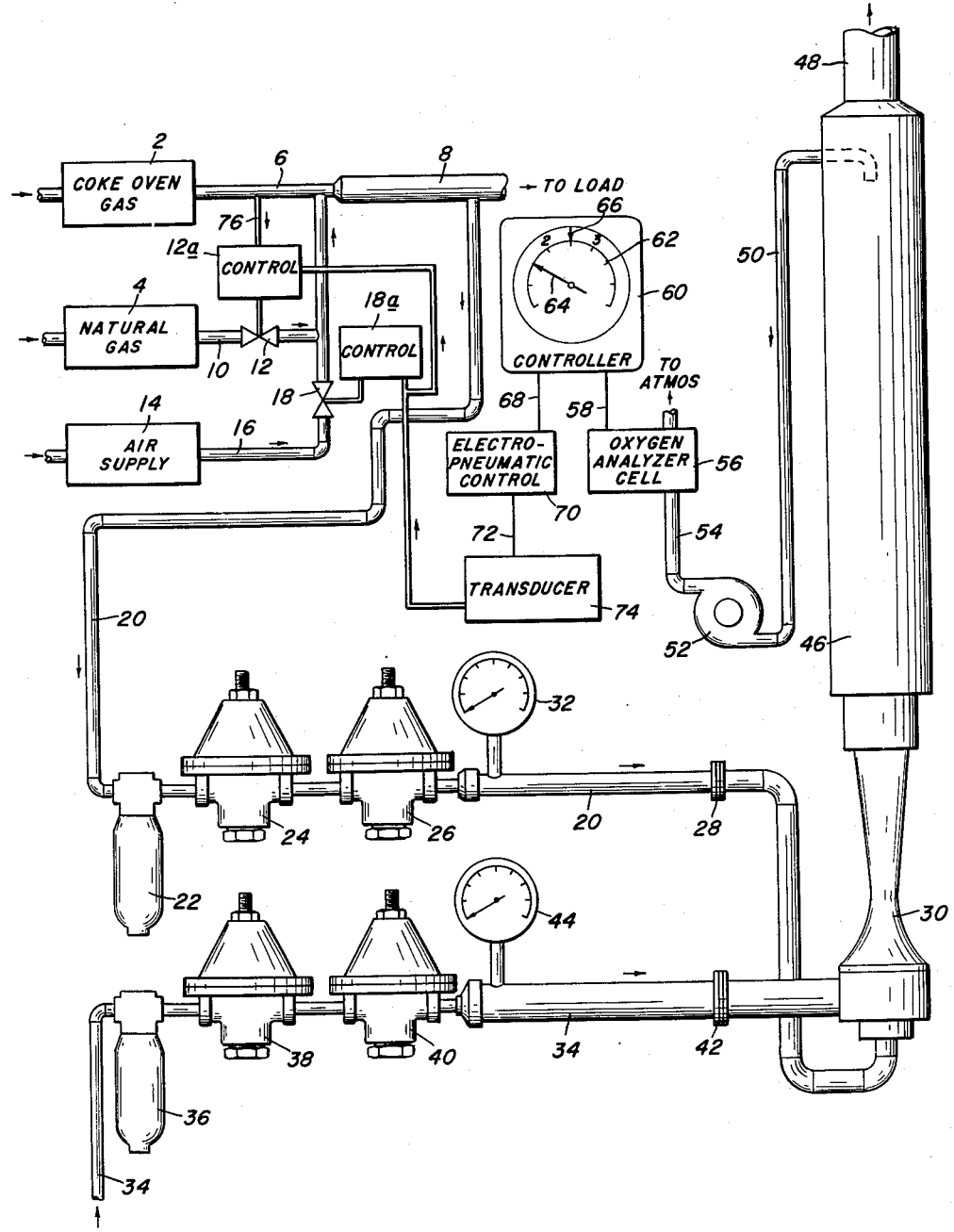

3,119,672
METHOD OF OBTAINING A FUEL GAS OF SUBSTANTIALLY CONSTANT COMBUSTION CHARACTERISTICS
Earl H. Peirce, Provo, Utah, assignor to United States Steel Corporation, a corporation of New Jersey
Filed Sept. 30, 1959, Ser. No. 843,545
2 Claims. (Cl. 48—180)

This invention relates to a method and apparatus for obtaining a fuel gas of substantially constant combustion characteristics and more particularly to such fuel gases which are supplied from one or more sources of varying composition. In steel mill operations, for example, coke oven gas and blast furnace gas are always available. However, the quantity of these gases which are available for combustion throughout the plant may vary. In some instances the total amount of these fuels are not sufficient to supply the needs of the plant and an additional fuel, such as natural gas, is also used. Since the combustion characteristics of the gases vary greatly, adjustment of the combustion equipment in the plant is necessary when the fuel mixture is varied. It has been suggested that the fuel supply be maintained at a constant B.t.u. value or a constant specific gravity. However, this equipment does not solve the problem since the amount of air necessary for combustion is not a function of the specific gravity or B.t.u. content.

It is therefore an object of my invention to provide a method of obtaining a fuel gas of substantially constant combustion characteristics.

This and other objects will be more apparent after referring to the following specification and attached drawings, in which the single figure is a schematic arrangement of the apparatus of my invention.

Referring more particularly to the drawings reference numeral 2 indicates a source of coke oven gas and reference numeral 4 indicates a source of natural gas. The source 2 is connected by means of a conduit 6 to a mixing chamber 8 which is shown as a manifold. Supply source 4 is connected to the chamber 8 by means of a conduit 10 having a valve 12 therein. An air supply source 14 is also connected to the chamber 8 by means of a conduit 16 having a valve 18 therein. Fuel from the chamber 8 is supplied to the combustion equipment throughout the plant for soaking pits, slab heating furnaces and the like. A conduit 20 leading from the chamber 8 includes a filter 22, pressure control valves 24 and 26 and a metering orifice 28 and terminates at a burner 30. A precision pressure gauge 32 is connected to the conduit 20 on the exit side of pressure control valve 26. Compressed air is delivered to the burner 30 through a conduit 34 having a filter 36, two pressure control valves 38 and 40 and a metering orifice 42 therein. A precision pressure gauge 44 is connected to conduit 34 on the exit side of control valve 40. If the temperatures of the mixed fuel gas and the air supplied to burner 30 differ greatly means (not shown) can be provided to make the temperatures approximately equal. Normally, however, such control is not necessary. The burner 30 is connected to a combustion chamber 46 which in turn is connected to a chimney 48. A sampling tube 50 is provided in the exit end of combustion chamber 46 and is connected to a flue gas sampling pump 52 which pumps gas through conduit 54 to a standard oxygen analyzer cell and electrical signal generator 56. This may be a type 7803-F, Thermomagnetic oxygen analyzer, manufactured by Leeds and Northrup (Ref. Bulletin 177001, Issue 5). The output of cell 56 is connected through leads 58 to an oxygen analyzer recorder controller 60 of a standard type such as a Model R Speedomax recorder controller manufactured by Leeds and Northrup. The controller 60 includes a scale 62, pointer 64 and a set point control 66. The output of recorder 60 is connected by leads 68 to a control 70 which may be a Series 60 Current adjusted electro-pneumatic control, manufactured by Leeds and Northrup. The signal from control 70 is connected through leads 72 to an electro-pneumatic converter or transducer 74, such as Catalogue Model 10970 manufactured by Leeds and Northrup (Ref. Bulletin No. 177009, Issue 1). The signal from transducer 74 is connected to control means 18a for valve 18 and/or control means 12a for valve 12. The controls 12a and 18a may be of any suitable type such as a Series 50 Conomotor pneumatically positioned power actuator, manufactured by the Conoflow Corporation (Ref. Bulletin B–50–3, 1957). If desired there may be a pressure feed back 76 from conduit 6 to control 12a.

The operation of my device is as follows:

The set point adjustor 66 is set at the desired point which is shown at 2.5% oxygen. A sample of the mixture and gas in the chamber 8 is passed through conduit 20 and delivered to burner 30 at a controlled rate and pressure. Air is delivered through conduit 34 at a controlled rate and pressure to burner 30. The fuel gas and air is mixed and burned by the burner 30 with the flame starting adjacent the entry to the combustion chamber 46. A sample of flue gas is taken from the exit end of chamber 46 and delivered to the oxygen analyzer cell 56 by means of pump 52. If the oxygen content of the flue gas is not varied from the set point the controller 60 will not operate. If there is a deviation in oxygen content from the set point a deviation signal passes through leads 68 to the electro-pneumatic control 70 and the control signal passes through leads 72 to the transducer 74 which changes the electrical signal to a pneumatic signal for operating the control 12a or 18a. Assuming that the control 18a only is being used the control will operate to reduce the flow of air through valve 18 if the flue gas shows too much oxygen and to increase the flow of air if the flue gas shows too little oxygen.

Another method of operation would be to eliminate the air supply 14 and operate control 12a to increase the supply of natural gas when the flue gas shows too much oxygen and to decrease the flow of natural gas when the flue gas shows too little oxygen. It will be understood that gases other than coke oven gas, natural gas and air may be regulated. Also, means other than that shown may be used to analyze the flue gas and controls other than those shown may be used to vary the flow of supply gases. It is only necessary that there be two types of gas, one of which is a fuel gas, that the burnt gases be analyzed to determine its characteristics and that the proportions of the supply gases in the chamber 8 be varied when the burnt gases vary from a given norm so as to bring the mixture of gases in chamber 8 back to a substantially constant combustion characteristic. The control will give a constant combustion characteristic to the mixed gases which might be termed its chemical physical combustion factor. This is equal to CWF divided by the square root of G with CWF indicating units proportional to pounds of air required per pound of fuel to completely burn the fuel and G indicating the specific gravity of the fuel.

While one embodiment of my invention has been shown and described it will be apparent that other adaptations and modifications may be made without departing from the scope of the following claims.

I claim:

1. The method of obtaining a fuel gas having a constant combustion characteristic equal to $$\frac{CWF}{\sqrt{G}}$$

where CWF indicates units proportional to lbs. of air required per lb. of fuel gas to completely burn the fuel gas and G indicates the specific gravity of the fuel gas, which method comprises mixing a fuel gas with a gas of different composition, taking a relatively small sample of the mixed gases of a known amount and pressure, adding an oxygen containing gas of a known amount and pressure to said gas sample, burning the gas sample and oxygen containing gas, analyzing the burnt gases for oxygen content, and varying the proportion of the gases in said mixture when the burnt gases vary from a given norm of oxygen content to give the mixed fuel gas the said constant combustion characteristic.

2. The method of claim 1 including the steps of delivering the unburnt portion of said mixed gases to a load, supplying combustion oxygen to the gases at the load, and burning the gases and oxygen at the load.

References Cited in the file of this patent

UNITED STATES PATENTS

| | | |
|---|---|---|
| 1,686,751 | Hutton | Oct. 9, 1928 |
| 1,704,101 | Pinkerton | Mar. 5, 1929 |
| 1,708,958 | Schmidt | Apr. 16, 1929 |
| 2,260,821 | Bendy | Oct. 28, 1941 |
| 2,603,085 | Cannon | July 15, 1952 |
| 2,697,652 | Ribble et al. | Dec. 21, 1954 |